United States Patent
Ushakov et al.

(10) Patent No.: US 12,407,882 B2
(45) Date of Patent: Sep. 2, 2025

(54) DISPLAYING ITEMS RELEVANT TO A VIDEO

(71) Applicant: TAP Technologies SA, Geneva (CH)

(72) Inventors: Valery Ushakov, Geneva (CH);
Andrey Tatarinov, Geneva (CH);
Aleksandr Kozlov, Geneva (CH);
Anna Zakutniaia, Geneva (CH)

(73) Assignee: TAP Technologies SA (CH)

( * ) Notice: Subject to any disclaimer, the term of this patent is extended or adjusted under 35 U.S.C. 154(b) by 7 days.

(21) Appl. No.: 18/461,768

(22) Filed: Sep. 6, 2023

(65) Prior Publication Data

US 2024/0089522 A1    Mar. 14, 2024

Related U.S. Application Data

(60) Provisional application No. 63/405,148, filed on Sep. 9, 2022.

(51) Int. Cl.
| | |
|---|---|
| *H04N 21/254* | (2011.01) |
| *G06F 16/732* | (2019.01) |
| *G06F 16/783* | (2019.01) |
| *G06Q 30/0601* | (2023.01) |
| *H04N 21/2187* | (2011.01) |
| *H04N 21/4725* | (2011.01) |

(52) U.S. Cl.
CPC ..... *H04N 21/2542* (2013.01); *G06F 16/7328* (2019.01); *G06F 16/7837* (2019.01); *G06Q 30/0601* (2013.01); *H04N 21/2187* (2013.01); *H04N 21/4725* (2013.01)

(58) Field of Classification Search
None
See application file for complete search history.

(56) References Cited

U.S. PATENT DOCUMENTS

| | | | |
|---|---|---|---|
| 11,785,280 B1 * | 10/2023 | Dakss | H04N 21/43079 725/37 |
| 2007/0078774 A1 * | 4/2007 | Brown | G06Q 30/0643 705/58 |
| 2014/0177964 A1 * | 6/2014 | Godlewski | H04N 21/2343 382/190 |
| 2015/0248918 A1 * | 9/2015 | Tang | H04N 21/47205 715/719 |
| 2017/0244999 A1 * | 8/2017 | Chen | G06F 16/24578 |
| 2021/0084389 A1 * | 3/2021 | Young | H04N 21/8547 |
| 2022/0329909 A1 * | 10/2022 | Ramirez Juan | G06F 3/0482 |
| 2024/0144392 A1 * | 5/2024 | Drynan | H04N 21/8586 |

FOREIGN PATENT DOCUMENTS

| | | | | |
|---|---|---|---|---|
| WO | WO-2021051111 A1 * | 3/2021 | | G06F 1/1686 |

\* cited by examiner

*Primary Examiner* — Junior O Mendoza
(74) *Attorney, Agent, or Firm* — Endurance Law Group PLC; James R. Yee

(57) ABSTRACT

A system and method are suitable for product placement. The system having a user device including a touch-sensitive screen, a camera for capturing video, and a wireless telecommunication module. The mobile device configured present to the user, via the touch-sensitive screen, a live video feed of the view of the camera, receive from the user, input selections to initiate a video search based on the view of the camera, send a video search query to a server that is based on images captured by the camera, receive a response to the video search query from the server and display items appropriate to the view of the camera.

23 Claims, 3 Drawing Sheets

Example item placement index table

| 53 | 54 | 55 | 56 | 57 | 58 | 59 | ... | 57n | 58n | 59n |
|---|---|---|---|---|---|---|---|---|---|---|
| Video clip signature | Next signature in sequence | Video ID | Video Clip Time Location | Item 1 ID | Item 1 Time placement Start | Item 1 Time placement End | ... | Item n ID | Item n Time placement Start | Item n Time placement End |
| [1,2,...,10] | [2,7,...,10] | Video1 | 00:06:28 | 100 | 00:06:05 | 00:06:35 | ... | ... | ... | ... |
| [5,9,...,98] | [3,4,...,84] | Video1 | 00:33:20 | 102 | 00:32:00 | 00:37:00 | ... | ... | ... | ... |
| [6,8,...,54] | [4,2,...,22] | Video1 | 00:59:00 | 103 | 00:57:00 | 01:00:00 | ... | ... | ... | ... |
| [5,3,...,84] | [5,1,...,57] | Video1 | 01:06:30 | 100 | 01:06:30 | 01:26:30 | ... | ... | ... | ... |
| [8,4,...,29] | [6,0,...,59] | Video1 | 01:45:00 | ... | ... | ... | ... | ... | ... | ... |
| [9,4,...,39] | [7,6,...,38] | Video2 | 00:24:00 | 104 | 00:21:00 | 00:25:00 | ... | ... | ... | ... |
| [7,2,...,63] | [8,3,...,47] | Video2 | 01:47:00 | 105 | 01:45:00 | 01:50:00 | ... | ... | ... | ... |
| [6,8,...,11] | [9,2,...,18] | Video3 | 00:10:00 | 106 | 00:10:00 | 00:25:00 | ... | ... | ... | ... |
| [7,3,...,90] | [0,6,...,60] | Video3 | 00:45:00 | 108 | 00:43:00 | 00:47:00 | ... | ... | ... | ... |
| [1,9,...,29] | [1,9,...,24] | Video3 | 00:49:00 | 109 | 00:44:00 | 00:46:00 | ... | ... | ... | ... |
| [3,4,...,18] | [2,4,...,98] | Video4 | 01:25:00 | 102 | 01:15:00 | 01:30:00 | ... | ... | ... | ... |

DISPLAYING ITEMS RELEVANT TO A VIDEO

CROSS REFERENCE TO RELATED APPLICATIONS

This application claims priority to U.S. Provisional Patent Application Ser. No. 63/405,148, filed on Sep. 9, 2022 (ELKINER-P0010P), the entire disclosure of which is hereby incorporated by reference and relied upon.

FIELD OF THE INVENTION

The present invention relates to presenting items, such as those linked to purchasable products, in synchronisation with a video that is displayed, for example, on a screen of a video content player, such as a television. In particular, the present invention relates to presenting such items on a screen of a user device, such as a mobile device, that is separate from the video content player. The present invention also extends to the automatic recognition of the video so that appropriate items can be so displayed.

BACKGROUND OF THE INVENTION

Movies or other videos often include product placement: Products, brands or other items are strategically featured in videos with the intent that viewers will be influenced to buy the associated items. However, this relies on consumers recalling the product or brand later, many hours or days after watching the video. By that time, the memory of the item, and the desire to purchase it may have faded. It is therefore desirable to provide a way of allowing in-the-moment purchasing.

One work-around for this is to allow a consumer to pause the video they are watching to allow a search is carried out for the desired products. For example, a video player can be paused whilst a consumer uses their mobile device to search for a desired item to purchase. However, this is not possible for all video content. In any case, even if it is possible to pause video content, this may not be desirable, especially when video is transmitted live, or to a group of spectators simultaneously. Furthermore, pausing video in this way interrupts the flow and enjoyment of the video.

Another problem with existing product placement is that it relies on the consumer being able to recognise the item or brand, and be capable of seeking it out, for example by using keyword searches within electronic commerce environments. If the item is not easily recognisable it may be very difficult for a consumer to find the item, especially if they cannot compose an adequate search query.

A further challenge is the promotion of items that are relevant to a video, but cannot be visually manifested in it. This may include digital items, related video content, mobile applications, subscriptions, non-fungible tokens (NFTs) and others.

There are many unsatisfactory ways to address these problems:

For example, one way is to feature consumer items within videos more prominently. Another is to provide advertising for an item within the video content itself. In practice, these approaches are undesirable as they significantly detract from the artistic quality and enjoyment of the video. It is generally preferred that product placement is subtle.

Another approach is to provide a machine-readable barcode as an overlay to video content shown via a video player. The barcode encodes a hyperlink to an online sales platform that includes specific items relevant to the video content. A consumer can scan the barcode with their mobile device, with the barcode allowing the mobile device to provide in-the-moment access to purchasable items without the need to pause video playback. However, this approach is still unsatisfactory because the presence of the barcode is visually jarring.

It is against this background that the present invention has been conceived.

SUMMARY OF THE INVENTION

According to a first aspect of the present invention there is provided a method of presenting a set of predefined items on a user interface in dependence on a video that is displayed on a screen of a video content player. Preferably, the set of predefined items are displayed in synchronisation with the video. The method may thus extend to providing a user interface on a user device, the user interface configured to present a set of predefined items in synchronisation with a video that is displayed on a screen of a video content player. Advantageously, this allows relevant items to be displayed to a user, via the user device, without altering or interrupting the video displayed on the screen of the video content player. Thus, if the video is being watched by others, their experience is not disrupted.

Preferably, the items are displayed in response to recognising the video, and moreover recognising a video time location, so that the items displayed can be predefined to be relevant to the content of the video.

Moreover, the user interface may be configured to display a changing set of items over time. Advantageously, this allows the items displayed to change in synchronisation with the changing content of the video.

Preferably, the items that are displayed by the user interface are user-interactable. Selection by a user of a user-interactable item initiates a transaction in which the user can purchase an article to which the item relates.

Preferably, the method comprises loading, on to the user device, an application that when executed on the user device, configures the user device to operate as defined herein. Preferably, the user device comprises a telecommunication module operable to download the application from an application repository. The application repository may be an application hosting platform, such as the Apple Appstore, or Google Play store for example.

Preferably, the user device comprises a camera arranged to capture a sequence of images of the video that is displayed on the screen of the video content player. Aside from this, the video content player and the user device need not be communicatively linked. Thus, synchronisation can be achieved in a straightforward manner simply involving the camera of the user device receiving the images of the video displayed on the screen of the video content player.

Preferably, the user device is configured to process each image of the video that is displayed on the screen of the video content player to derive an image signature from it. Advantageously, an image signature requires less bandwidth and storage space than the image from which it derived.

Preferably, the user device is further configured to transmit a video search query to a video search engine, and receive a response from the video search engine, the response comprising the set of predefined items to be displayed in synchronisation with the video displayed on the screen of the video content player. The video search engine is preferably hosted on a cloud based server. Accordingly, the video search engine is configured to respond to the queries sent to it by many different user devices. Advantageously, this means the user devices need not process search queries, nor store search results—this being performed centrally by the video search engine.

Preferably, the video search query comprises at least one image signature derived by the user device. Ideally, the video search query comprises a sequence of image signatures, derived from a corresponding sequence of images of the video that is displayed on the screen of the video content player. Advantageously, this can improve the accuracy with which the video can be identified and consequently the most relevant items can be displayed for that video.

The video search query may comprise a video capture timestamp substantially correlated to the time at which an image was captured by the camera of the user device. The video search engine transmits, in the response to the query, at least one item listing timestamp to enable at least one corresponding item to be listed by the user interface of the user device in synchronisation with the video displayed on the screen of the video content player. Moreover, the user device is configured to calculate when to present the set of predefined items based on their respective item listing timestamp. The calculation performed by the user device may include comparing item listing timestamps with the video capture timestamp.

Preferably, the method comprises maintaining a database of records, each record storing and being indexed by a video clip signature, each record also storing in association with its respective video clip signature at least one of the set of predefined items.

Moreover, the video search engine may be configured to receive a video search query and in response performs a similarity search to identify a candidate record of the database. Preferably, the candidate record is indexed by a video clip signature that has a similarity with the image signature included with the video search query that is above a similarity threshold. Subsequently, the video search engine is configured to send as a response to the video search query, any predefined item stored in that candidate record.

Optionally, each record stores, in association with its respective video clip signature, identifiers of the video and time location from which the video clip signature is derived. Furthermore, records may be sequentially linked to one another in correspondence with whether the video clip signatures of those records are derived from sequential video clips. For example, a first record in a sequence may also include the video clip signature of the second record in the sequence.

Preferably, pointers may be used to allow efficient traversal of the records. For example, a first record in a sequence may include a pointer to a second record in that sequence, the second record in that sequence may include a pointer to a third record in that sequence, and so on.

In any case, a sequential set of records can therefore be established. Advantageously, this allows records to be quickly traversed in a manner that tracks the chronological sequence of a video with which those records are associated.

Thus, the video search engine can be configured to receive a video search query that comprises a sequence of image signatures, and in response can perform a similarity search to identify a candidate sequential set of records of the database. The candidate sequential set of records include a sequence of video clip signatures that have a similarity with the sequence of image signatures included with the video search query that is above a similarity threshold. Advantageously, this improves the reliability of the video search due to more specific search parameters.

Subsequently, the video search engine may send as a response to the video search query, any predefined item stored in the identified candidate sequential set of records. Furthermore, predefined items stored in records subsequent to the identified candidate sequential set of records may be sent. Advantageously, this allows predefined items to be sent to the user device ahead of time, i.e. for a pre-recorded video, such as a movie, predefined items can be sent to the user device that are registered against video content that has not yet been played. Beneficially, this allows caching of those items at the user device until the correct time to display them, thereby improving synchronisation.

The video search engine may be configured to determine when the video search query is complete enough to perform a reliable match, and in response transmit to the user device a reliable match confirmation. Preferably, the user device is configured to receive the reliable match confirmation and, in response, cease capturing and processing images of the video that is displayed on the screen of the video content player. Advantageously, the use of a reliable match confirmation prevents superfluous processing by the mobile device.

Nonetheless, the video search engine may continue to send predefined items to be displayed by the user device in synchronisation with the video displayed on the screen of the video content player. This can be achieved by the video search engine traversing sequentially-linked records, and sending the predefined items stored in each one, along with instructions as to when those items are to be displayed via respective item listing timestamps. Specifically, each predefined item is sent to the user device with a corresponding item listing timestamp. Naturally, an item listing timestamp may be correlated with a corresponding video clip time location.

Preferably, the method comprises performing an item registration operation. In particular, the item registration operation may comprise providing an item registration interface to allow an item-managing user to register items to the database.

The item registration interface is typically provided by a device of the item-managing user, the device having a screen to present that user with information, and input components for receiving inputs from that user. The input components may be a keyboard and mouse, for example.

Preferably, the item registration interface comprises a video selection interface and an item selection interface which are configured to receive inputs from the item-managing user to respectively specify a video, and at least one item. The video selection interface may include access to a video library via which the item-managing user can search for, filter and select a video. The item selection interface may include access to ecommerce facilities via which item details, including description, images, price and so on can be obtained. The item selection interface may also allow items to be specified by the user via manual entry of those item details, and/or via URLs specified by the item-managing user to, for example, websites featuring the items Preferably, the item registration interface further comprises a timeline tool configured to present a timeline representation of the video to the item-managing user, and receive inputs from the item-managing user to specify a time location within the video. The time location is typically a period having a start time and end time. Additionally, the item registration interface is configured to receive an input from that user to associate at least one specified item with that time location.

Preferably, the item registration interface may further comprise a video preview panel via which the selected video can be played by the item-managing user. Moreover, the video preview panel is configured to display a portion of the video corresponding to the time location specified by the item-managing user. Advantageously, this allows the item-managing user with feedback about the content of the video, and so items can be registered to an appropriate time location. This is beneficial when the items relate to the content of the video.

Preferably, the method comprises providing at least one signature generator. The at least one signature generator is configured to receive an image as an input and in response output a signature of that image. Preferably, the signature comprises a multidimensional vector. A first of the at least one signature generators may be provided on the user device, in which case its output comprises image signatures as described above. A second of the at least one signature generators may be provided on the server, in which case its output comprises a video clip signature as described above.

Preferably, the at least one video signature generator comprises at least a part of a computer-implemented convolutional neural network (CNN). Specifically, the CNN is trained as an image classifier. The CNN comprises a succession of interconnected layers, vector outputs from earlier layers being used as inputs to later layers. The end layer of the CNN is typically the image classification layer. The video signature generator transmits an image to an initial input layer of the CNN, and then vector outputs from one of the end layers is used to provide a multidimensional vector as the output of the video signature generator. Thus, whilst the CNN is trained as an image classifier, the classification layer is not used to classify the input image. Rather the classification layer, or the layer prior to the classification layer outputs a multidimensional vector as a reliable signature of the input image.

The use of a CNN to output a signature in this way has been determined to be advantageous because the signature generated is a reliable indicator of the content of the image, generally unaffected by image distortions such transform or colour shifts.

Accordingly, the signature generated using a source video frame as an input, and the signature generated using a captured image of that same video frame will be very similar to one another despite significant disparities between the inputs cause by image capture.

Preferably, the CNN is trained using a training set of visually distinctive samples.

Preferably, the method comprises training a CNN to function, at least in part, as the video signature generator, and then transferring the video signature generator including the trained CNN to the user device for use in forming video search queries that include image signatures derived from images.

Preferably, the method comprises performing a population operation to populate the database of records. A database population module may enact the population operation.

Preferably, the population operation may comprise loading a source video, and then sending frames of that loaded source video to a signature generator to generate a video clip signature corresponding to a respective frame. The population operation may further comprise storing the video clip signature in a record of the database in association with a video identifier of the loaded source video, as well as a video clip time location. A timing reference is queried to obtain a time value for the video clip time location. The video identifier uniquely references the video to allow it to be located in a database.

Preferably, the population operation further comprises sequentially linking records together in correspondence with whether the video clip signatures of those records are derived from sequential video clips. For example, two video clip signatures may be stored in a record of the database, a primary signature associated with the current video clip, and a secondary signature associated with the next video clip.

Preferably, the source video may be loaded from a source video repository of pre-recorded video content, for example a video library that includes movies. Alternatively, the source video may have a different provenance, originating from a live broadcast, for example. In either case, the video content comprises a succession of image frames, which can be processed by the signature generator to generate corresponding video clip signatures.

Preferably, the timing reference is configured to determine a time value for use as the video clip time location in dependence on the provenance of the source video. In particular, if the source video derives from a live broadcast, the time value corresponds to the live time of transmission. If the source video derives from a pre-recorded source video, then the time value that is provided may be relative to an end of the pre-recorded video: e.g. elapsed time since the start of video.

Preferably, the method may comprise a frame selection routine in which a subset of frames of the loaded source video are selected, prior to passing them to the signature generator. Whilst this leads to a signature representation of the video content that has a lower temporal resolution, it has been determined that this does not significantly affect searching performance, especially when compared to the advantage of the reduced computational burden of processing and storing every frame of the source video. It is postulated that this beneficial trade-off can be made due to the general stability of images in most video content.

In certain embodiments, the frame selection routine may sample frames at predetermined intervals—for example, one every second (i.e. every thirty frames for video played at 30 frames per second). In other embodiments, the frame selection routine may progressively compare successive frames to determine a delta (i.e. image difference) between them, and then select frames to pass to the signature generator when the delta exceeds a set threshold.

Thus, by performing the population operation, the database can be populated with records that are indexable via their video clip signatures, and each record having associated with its signature a video identifier and a video clip time location.

Preferably, the population operation may further comprise adding predefined items to records of the database. To this end, the population operation may comprise performing an item registration operation.

Naturally, aspects of the invention extend to a system configured to implement at least part of the method relating to the first aspect of the present invention. Furthermore, aspects of the invention may extend to the individual components of that system and/or the functionality that they provide.

For example, an aspect of the invention may reside in a mobile user device. Preferably, the mobile user device comprises at least one of a touch-sensitive screen, a camera for capturing video, and a wireless telecommunication module. Preferably, the wireless telecommunication module is arranged to download an application for execution on the mobile device, the executed application configuring the mobile device to:

present to the user, via the touch-sensitive screen, a live video feed of the view of the camera;

receive from the user, input selections to initiate a video search based on the view of the camera;

send a video search query to a server that is based on images captured by the camera;

receive a response to the video search query from the server; and display items appropriate to the view of the camera.

Further aspects of the invention may be provided in the form of systems for carrying out the method according to the first aspect.

It will be understood that features and advantages of different aspects of the present invention may be combined or substituted with one another where context allows.

Furthermore, such features may themselves constitute further aspects of the present invention. For example, the features, or parts thereof, of the method or system, such as the mobile user device, the server, the video search engine, the database, the database population module and the item registration interface may themselves constitute further aspects of the present invention.

Additionally, aspects relating to video search methods may further include steps carried out by components of the system. Conversely, aspects relating to the system, or components thereof, may implement steps associated with the method of the first aspect according to the invention.

BRIEF DESCRIPTION OF THE SEVERAL VIEWS OF THE DRAWINGS

In order for the invention to be more readily understood, embodiments of the invention will now be described, by way of example only, with reference to the accompanying drawings in which.

DETAILED DESCRIPTION OF THE INVENTION

Figure 1:
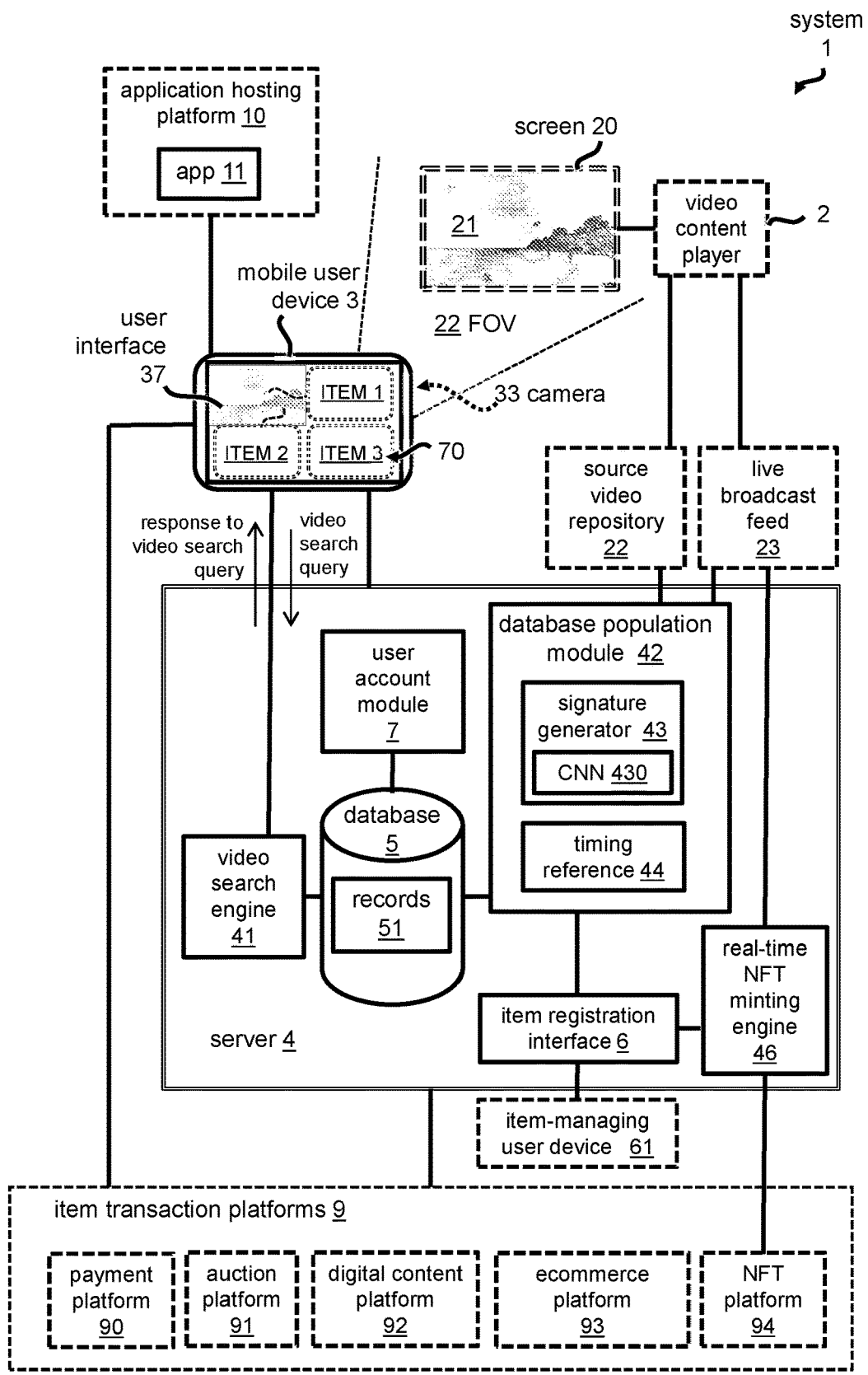
FIG. 1 is a schematic diagram of a system according to various embodiments of the present invention.

FIG. 1 is a schematic diagram of a system 1 according to various embodiments of the present invention. The system 1 primarily comprises a mobile user device 3 that is in the form of a smartphone, and a server 4.

It should be noted that every component shown in and described with reference to FIG. 1 is not necessarily an essential part of embodiments of the invention—they are merely included for completeness. Notably, some of the components may be simply used by or interact with the system 1 rather than necessarily being integral parts of the system 1 itself.

For example, an application hosting platform 10, a screen 20, a video content player 2, a source video repository 22, a live broadcast feed 23, an item-managing user device 61, and various item transaction platforms 9, shown in dotted outline in FIG. 1, are components that typically interact with the system 1. Nonetheless, other embodiments of the invention the system may include at least one of these components.

Furthermore, whilst the communication interconnections between various components of or interacting with the system 1 are shown as connecting lines, these are not exclusive. Each component may, in certain embodiments, communicatively connect with all others.

In various embodiments the communication interconnections may be embodied by a wired and/or wireless local area network (LAN), peer-to-peer wireless connections (e.g. using at least one of Bluetooth and direct Wi-Fi), a wide area network (WAN) such as the Internet, or a combination of these. Moreover, certain components shown in FIG. 1 may reside on a single device and so, in this case, the communication interconnections may include intra-device communication channels.

Leading on from this, certain components shown in FIG. 1 may be provided as part of or otherwise integrated with others. For example, the server 4 and the application hosting platform 10 may be implemented on a common dual-functionality server. Moreover, components may not necessarily be in the form of a single physical machine or device. For example, the term "server" may encompass, for example, a distributed or "cloud" computing service, engine, service or platform.

Also, for simplicity and clarity, only single exemplary instances of most components of the system 1 are shown in FIG. 1. Nonetheless, in practice, the system 1 will typically include at least thousands of mobile user devices 3.

In the present embodiment, the video content player 2 and screen 20 are part of a television which is configured to receive real-time television broadcasts from the live broadcast feed 23, and also access videos on demand from a video streaming service provided by the source video repository 22. However, in alternative embodiments, the video content player 2 may be in another form, such as a DVD or other media player, a computer or a dedicated video streaming device.

Figures 2, 3:
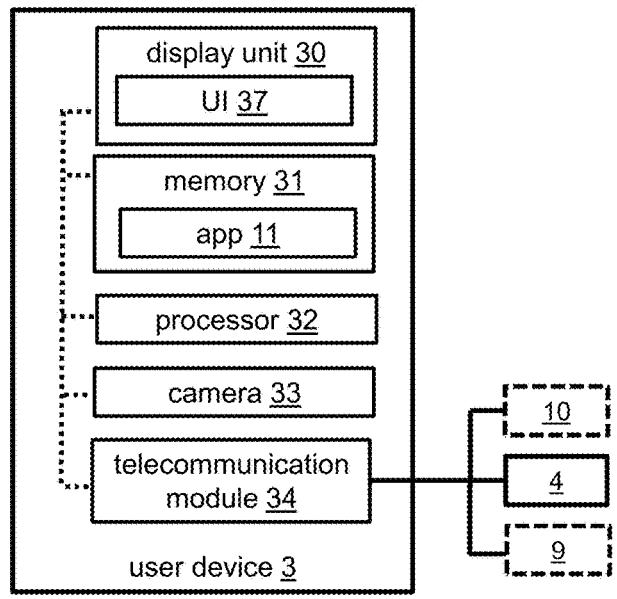
FIG. 2 is a more detailed schematic block diagram of a mobile user device of the system of FIG. 1.
FIG. 3 is an example schematic excerpt of a collection of records of the database of the system of FIG. 1.

FIG. 2 is a more detailed schematic block diagram of the mobile user device 3 of the system of FIG. 1. The user device 3 comprises a display unit 30 in the form of a touch-sensitive screen, a memory 31, a processor 32, a camera 33, and a wireless telecommunication module 34. Other components, as typically found on smartphones, may also be provided.

An application ("app") 11 is downloaded via the wireless telecommunication module 34 from the application hosting platform 10 (e.g. the Apple Appstore, or Google Play store) and loaded into memory 31 for execution via the processor 32. When executed, the app 11 configures the operation of the mobile user device 3, including the rendering of a user interface 37 on the display unit 30.

Referring back to FIG. 1, the user interface 37 issues instructions to a user to manipulate the user device 3 so that the screen 20 of the video content player 2 is within the field of view 22 of the camera 33. The camera 33 is the forward facing camera of the user device 3, situated on the reverse side to the display unit 30. To assist the user, the user interface 37 displays a live view of the field of view of the camera 33, as shown in FIG. 1.

The mobile user device 3 is then configured by the app 11 to receive a user capture command to begin capturing a sequence of images, each of which feature video content 21 displayed on the screen 20 of the video content player 2. The app 11 configures the processor 32 of the user device 3 to process the sequence of images to derive a corresponding sequence of video search queries. The app 11 then configures the user device 3 to transmit the video search queries via the telecommunication module 34 to the server 4. The app 11 configured the user device to establish a connection with the server 4 such that each video search query can be sent to the server 4 as it is generated, but with the sequential association between the queries being preserved.

More specifically, the app 11 processes each image to derive a corresponding image signature from it, and the image signature is included in the video search query that is sent to the server 4. Advantageously, this enhances the ability for the video content to be correctly identified, reduces the computational burden on the server 4, and furthermore the image signature that is sent requires less bandwidth and storage space that the image from which it is derived.

To enhance the reliability of the image signature that is generated, the app 11 configures the user device 3 to process an area in a captured image that predominantly features the screen 20, rather than the surroundings of the screen 20 (e.g. a wall). To this end, a screen position detector is implemented by the app 11 that configures the mobile device 3 to execute a screen position prediction routine. In certain embodiments, this is achieved by implementing a quadrangle (or box) detection algorithm or neural network.

To further enhance reliability, the captured image, or isolated part thereof, is treated to standardise it. For example, the standardisation may involve resizing to predefined dimensions, and padding in which grey pixels are added to the image to ensure it complies with a standardised aspect ratio. An optimal size for the standardised image that is processed to generate an image signature has been determined to be 244×244×3, although other sizes are possible in alternative embodiments.

As will be described in further detail below, the server 4 processes the query and then responds to the video search queries with at least one video search result. Once a response is received from the server 4 the app 11 configures the user device 3 to cease capturing and processing the images. Advantageously, this minimises unnecessary resource usage of the mobile device.

The at least one search result includes a set of items 70 predefined as being relevant to the content of the video being displayed on the screen 20 of the video content player 2. Specifically, the set of items 70 are predefined to be displayed at specified time locations that are synchronised with the video.

Accordingly, the app 11 receives the at least one video search result that include the set of items 70, and then configures the user device 3 to display representations of these items 70 via the user interface 37 at the appropriate time. Consequently, representations of the items that are displayed by the user interface 37 can change over time in synchronisation with the changing content of the video.

The items 70 are displayed as user-interactable elements (ITEM 1, ITEM 2, ITEM 3) of the user interface 37. These can each be selected by a user to express an interest in the item represented. Doing so may cause the user interface 37, under control of the app 11, to display further information associated with a respective item 70. Moreover, additional UI elements are displayed that, in response to user-selection, trigger further actions such as saving the items, or initiating a transaction.

Specifically, a save UI element is displayed that, if selected by a user saves the item 70 in a history or favourites list. This can be revisited by a user in the future to take further action such as initiating a transaction.

A purchase UI element is also displayed that, if selected by a user, initiates a transaction. Moreover, in response to receiving such a user selection, the app 11 is configured to initiate a transaction that relates to the item 70. Specifically, the app 11 configures the user device 3 to connect with at least one of the item transaction platforms 9, such as a payment platform 90, an auction platform 91, a digital content platform, an ecommerce platform 93 and/or an NFT platform.

This may be done directly from the app 11 to those platforms, or the app 11 may interface with other third-party apps loaded on to the mobile user device 3, such as those relating to payment, auction, digital content, ecommerce and NFTs, and send transaction instructions to those third-party apps, thereby allowing an appropriate transaction to be initiated.

An item 70, as described herein, may principally refer to a digital package that includes components such as, for example, a unique identifier (ID) of an item, an image of an item, an image of its representation when displayed as a user-interactable element on the user interface 37, a description of the item and a URL (or similar) to specify how the transaction relating to the item can be initiated, and/or further details about the item. Components of the digital package may also include information and functionality associated with items or their sale, for example, special offers, deals and call-back requests. Digital package components may also include external links to allow access, via a mobile internet browser loaded on the user device 3, to additional information and functionality about the item 70. For example, in certain embodiments, the components could include links to an auction, a prize draw, or a loyalty scheme, each respective link providing access to a user interface (e.g. a contact form or similar) to allow user participation. In certain embodiments, an item component may comprise information about video content which formed the basis of the video search query, such as facts or the biography of characters or actors in that video content, their preferences, and historical references. Advantageously, this can provide access to a richer media experience than the original video content alone—whilst at the same time providing the option of the original video content to remain undisrupted for other viewers. Where context allows herein, an item may also or instead refer to one or more of those components alone or in combination with others.

Also, where context allows herein, an item may also or instead refer to a product or service that is purchasable via conducting the transaction. Some examples of such purchasable products and services include branded merchandise, clothing, jewellery, service subscriptions, digital content such as videos, images, audio, and tokens such as NFTs (Non-Fungible Tokens).

The action taken by the mobile user device 3 in response to a user selection of an item 70 displayed via the user interface 37 will be dependent on the type and/or provider of the item.

For example, if the item relates to a product, then the app 11 typically configures the user device 3 to initiate a transaction by connecting to the ecommerce platform 93 to select that product for purchase, and the payment platform 90 to pay for that product. To this end, the app 11 may include an integrated ecommerce module which governs product orders and payments.

Alternatively, the app 11 may interact with a third-party ecommerce app and/or payment app loaded on the user device 3.

Similarly, if the item relates to an NFT, then the app 11 typically configures the user device 3 to initiate a transaction by connecting to the NFT platform 94, and an NFT payment/auction platform. Notably, the app 11 may include or interface with a crypto-exchange gateway and/or a mobile crypto wallet, to allow transactions with crypto-exchanges and/or to perform blockchain-based transactions such as sale/purchase of cryptocurrencies such as Ether and Solana, notably for the purpose of transacting with NFT. This can also allow for the execution of block-chain based smart-contracts.

Advantageously, this improves the way product placement can be achieved. Products and other items can be displayed to a user, via the UI 37 of user device 3, without altering or interrupting the video displayed on the screen 20 of the video content player 2. Thus, if the video is being watched by others, their experience is not disrupted. Furthermore, items that may not naturally fit within the content of the video can be made available through the present system and method.

An additional advantage is that the user device 3 and the video content player 2 need not be set up to have special communication link with one another. This simplifies set up of the conferred functionality—all that a user needs to do is to download and run the app 11, and then aim the camera 33 at any screen 20 displaying video content 21. The app 11 automatically configures the user device 3 to process the sequence of captured images to derive video search queries that are sent to the server 4. The function of identifying the video content 21 being displayed on the screen 20 within the field of view 22 of the camera 33, and consequently identifying relevant items 70 to be displayed in synchronisation with that content 21 is primarily conducted at the server 4.

The server 4 comprises a video search engine 41, a database 5, an item registration interface 6, a user account module 7, a database population module 42, and a real-time NFT minting engine 46.

Following an initial downloading of the app 11, a user may be prompted to establish a user account with the server 4, via the mobile user device 3 establishing a connection with the user account module 7 and providing registration data to it.

This allows convenient server-side storing of information such as history or favourites lists as mentioned above, and also simplifies transactions performed with the various item transaction platforms 9.

The app 11 configures the user device 3 to initiate a connection with the user account module 7 of the server 4 to collect and store initial registration data. Login credentials, such as a username and password, are stored, as well as other credential data such as name and address that can be used for verifying the identity of a user and their authority to initiate a payment transaction. For example, details associated with a payment card may be stored against a user account.

Naturally, if a user already has a user account established with the server 4, then the registration process has already taken place (e.g. via another device), and so initial registration data is not required. A user merely needs to provide their login credentials to the app 11 to access their corresponding user account within the server 4. Specifically, providing login credentials to the app 11 on a user device 3 for the first time associates that user device 3 with the user account linked to those login credentials.

Following user log-in, the app 11 can automatically access the relevant user account on the server 4 when the user device 3 is used to open and run the app 11. A user merely needs to unlock the use of their device 3—typically via biometric or code verification—rather than input their specific username and password.

The server 4 is configured to receive and process video search queries from the user device 3. Specifically, the video search engine 41 searches records 51 stored in the database 51 utilising the image signatures provided within the video search query received from the user device 3 as a search parameter.

FIG. 3 is an example excerpt of a collection of records 51 of the database 5 in the form of an item placement index table 52. The table represents the typical relational data structure of the database 5. In alternative embodiments, the records 51 may be stored in an alternative form, in a differently structured database (e.g. a graph database).

The table 52 represents, in columns, a series of attributes, including a video clip signature attribute 53, a next signature in sequence attribute 54, a video ID attribute 55, a video clip time location attribute 56, and a group of attributes associated with a first item—specifically, a first item ID attribute 57, a first item time placement start attribute 58 and a first item time placement end attribute 59. The table 52 may also have a additional n groups of attributes each group associated with an nth item, the attributes corresponding to those of the first item. Specifically, the nth item group includes an nth item ID attribute 57n, an nth item time placement start attribute 58n and an nth item time placement end attribute 58n.

Each row of the table 52 represents a record, each record holding a value of the attributes. The table 52 is indexed by the video clip signature attribute 53.

Accordingly, the server 3 can provide a database 5 of records 51, each record storing and being indexed by a video clip signature, each record also storing in association with its respective video clip signature at least one of the set of predefined items.

The video search engine 41 runs a search against this index to determine at least one record that has a video clip signature of a value the same as, or substantially similar to the image signature provided in the search query originating from the mobile device 3.

To this end, the video search engine 41 is configured to perform a similarity search to identify a candidate record of the database. The candidate record is indexed by a video clip signature that has a similarity with the image signature included with the video search query that is above a similarity threshold.

On determining a match with a record, the records values are used to form at least part of the response to video search query originating from the mobile device 3.

Each record is typically associated with at least one item, as uniquely identified by a corresponding item ID attribute. In certain embodiments, the item ID can therefore be used by the server to retrieve a specific item, in the form of a digital package also stored in the database 5, to be included as one of the set of predefined items transmitted from the server 4 to the mobile device 3. The values of the time placement attributes 58, 59 are also included for that item.

Accordingly, the user device 3 is configured by the app 11 to transmit a video search query to a video search engine 41, and receive a response from the video search engine 41, the response comprising the set of predefined items to be displayed in synchronisation with the video displayed on the screen 20 of the video content player 2. The values of the time placement attributes provide the app 11 of the user device 3 with information to determine when to display a respective item 70 on the user interface 37, and when to remove the item from display.

For example, with reference to the first row of the table 52 associated with record 51*a*, the first item, with an ID of 100, is predefined to appear at 6 minutes and 5 seconds into the video identified as Video1, and then disappear thirty seconds later at 6 minutes and 35 seconds. This information is transmitted in the response to the video search query, and used by the app 11 to display items on the user interface 37 of the mobile device in synchronisation with the video content 21 displayed on the screen 20. The values of the time placement attributes effectively provide timestamps which aid synchronisation.

In other words, the video search engine 41 transmits, in the response to the query, at least one item listing timestamp to enable at least one corresponding item to be listed by the user interface 37 of the user device 3 in synchronisation with the video content 21 displayed on the screen 21 of the video content player 2.

Furthermore, the video search query originating from the mobile user device 3 may comprise at least one video capture timestamp associated with a corresponding image signature. This substantially correlates to the time at which the image (from which that corresponding image signature derives) was captured by the camera 33 of the user device 3. This can further aid in synchronisation, especially if there are communication delays between the user device 3 and the server 4.

For example, the user device 3 can be configured by the app 11 to calculate when to present the set of predefined items based on their respective item listing timestamp. The calculation performed by the user device may include comparing item listing timestamps with the video capture timestamp.

As mentioned, the video search query originating from the mobile user device 3 may comprise a sequence of image signatures, derived from a corresponding sequence of images of the video content 21 that is displayed on the screen 20 of the video content player. This can be used to progressively query the database 5 in the event that a confident and singular records match cannot be determined from a single image signature. This may arise, for example, when two different videos feature very similar content that leads to very similar video clip signatures. In such a situation, it is necessary to discriminate between those videos, each which may be a viable candidate.

This progressive querying is aided by linking separate records together. Specifically, records can be sequentially linked to one another in correspondence with whether the video clip signatures of those records are derived from sequential video clips. This is implemented in the present embodiment via the attribute 54 that identifies the next signature in a sequence. Advantageously, for a particular record, the value of this attribute serves as pointer to the next record, because it can be used as a search parameter for directly searching the index of the table 52. This allows the next record to be found quickly so that a sequence of video clip signatures can be efficiently compared to the sequence of image signatures originating from the user device 3.

In alternative embodiments, the progressive search may instead be implemented by searching the database 5 based on the values of video ID and video clip time location.

In any case, a sequential set of records can be established that tracks the chronological sequence of a video with which those records are associated.

Thus, the video search engine 41 is configured to receive a video search query from the user device 3 that comprises a sequence of image signatures, and in response performs a similarity search to identify a candidate sequential set of records of the database 5.

The candidate sequential set of records include a sequence of video clip signatures that have a similarity with the sequence of image signatures included with the video search query that is above a similarity threshold. Advantageously, this improves the reliability of the video search due to more specific search parameters.

Subsequently, the video search engine 41 can send as a response to the video search query, any predefined item 70 stored in the identified candidate sequential set of records. Furthermore, predefined items 70 stored in records subsequent to the identified candidate sequential set of records can be sent. Advantageously, this allows predefined items 70 to be sent to the user device ahead of time, i.e. for a pre-recorded video, such as a movie, predefined items can be sent to the user device that are registered against video content that has not yet been played. Beneficially, this allows caching of those items at the user device until the correct time to display them, thereby improving synchronisation. Additionally, because those items 70 are not immediately displayed on the user interface 37 this avoids inappropriate items being displayed, such as spoilers of movies or other video content.

Additionally, in certain embodiments, the user interface 37 of the app 11 is configured to receive user input to select whether item display should be isolated to the timing of the video search query, or continuous—i.e. items displayed and updated continually from the timing of the video search query onwards. To this end, the user interface 37 is configured to present a "follow-the-flow" UI element to the user which is user-interactable to receive such a user selection. Accordingly, new items can be continually displayed as a video progresses, without the need for a user to continually scan the screen 20 of the video content player.

As mentioned, the app 11 configures the user device 3 to cease capturing and processing images to minimises unnecessary resource usage of the mobile device. This is done once a response is received from the server 4, typically including the predefined items to be display by the user interface 37. However, in the present embodiment, the server 4 prioritises sending of a reliable match confirmation, ahead of sending the set of items 70. The user device is configured to receive the reliable match confirmation and, in response, cease capturing and processing images, including generating image signatures from them, and sending them to the server 4.

There may be zero-match circumstances under which a reliable match is not possible within a reasonable search timeframe. This can arise, for example, when the database 5 has not been populated based on the same video content 21 that is being displayed on the screen 20 of the video content player 2 during a video search query. However, the server 4 may be configured to respond to the video search query originating from the mobile user device 3, even under such zero-match circumstances.

To this end, the server 4 is configured to perform a zero-match circumstance query response operation, after a predetermined search timeframe. Such an operation can be performed on the basis of user-personalised data, and/or image analysis of the video content 21.

The server 4 is configured to generate items to be included in the response to the video search query, the items being based on, for example, information stored within a respective user account within the user account module 7. Specifically, the video search query received by the server 4 originates from a user device 3 associated with a respective user account which includes user-specific information such as previous video search queries and their results, preferences, favourites lists, and so on. This information is processed by the server 4 to generate a set of items to be sent back to the user device 3 under zero-match circumstances.

Alternatively, or in addition to this, image analysis of the video content 21 can be performed to classify features therein, with items being selected to be included in the response to the video search query depending on their classification. For example, if the video content includes certain product classification (e.g. clothing, electronic items, etc), then the response from the server can include items associated with those product classifications (e.g. links to a clothing or electronics retailer). Referring back to FIG. 1, the records 51 in the database 5, an example of which is shown in FIG. 3, are populated by a database population module 42 as part of a population operation. This takes inputs from the source video repository 22, the live broadcast feed 23, and the item registration interface 6.

As described, the set of items that are displayed in synchronisation with the video are predefined in terms of what items they are, and the time period relative to the video that they are displayed.

The items are predefined by an item-managing user. Moreover, an item-managing user can specify which items are registered to a particular record, along with the values of the time placement attributes associated with that respective item. Accordingly, item-managing users can register products and services to appear during specified time periods of specified video content. This is achieved via the item registration interface 6 hosted by the server 4.

Moreover, the item-managing user uses a device 61 to connect to the server 4 and access the item registration interface 6. This can be done by downloading an item registration program from the server 4 to the device 61, or otherwise accessing it remotely via a web browser or similar. In any case, the item registration interface 6 is made available to the item-managing user device 61.

An item-managing user may have an account with the server 4, and log into it in a similar manner as described above for a normal end user. This can provide the item-managing user with information and preferences that were established in a previous item managing session, for example.

The item-managing user account is typically set up by administrators of the system 1 to confer permissions to the item-managing user, typically restricting which set of items can be registered against which set of video content.

Permissions are granted by administrators depending on rights held by various stakeholders, including brand owners, movie studios, streaming platforms, TV channels, and their promoters and other agencies.

For example, a brand owner and a movie studio may have an agreement to allow items relating to the brands of that brand owner to be registered to appear in the videos owned by that movie studio. Accordingly, an associated item-managing user can be provided with permissions by the system administrator to register items of that brand owner to appear in response to a video search query that contains a signature derived from video content owned by the movie studio. Another example could be an item-managing user granted with permissions to place items within a live broadcast owned by a TV channel, the items chosen from a set pre-authorised by that TV channel. These items would typically be linked to a commercial deal between that TV channel and the promoters of those items.

Figure 4:
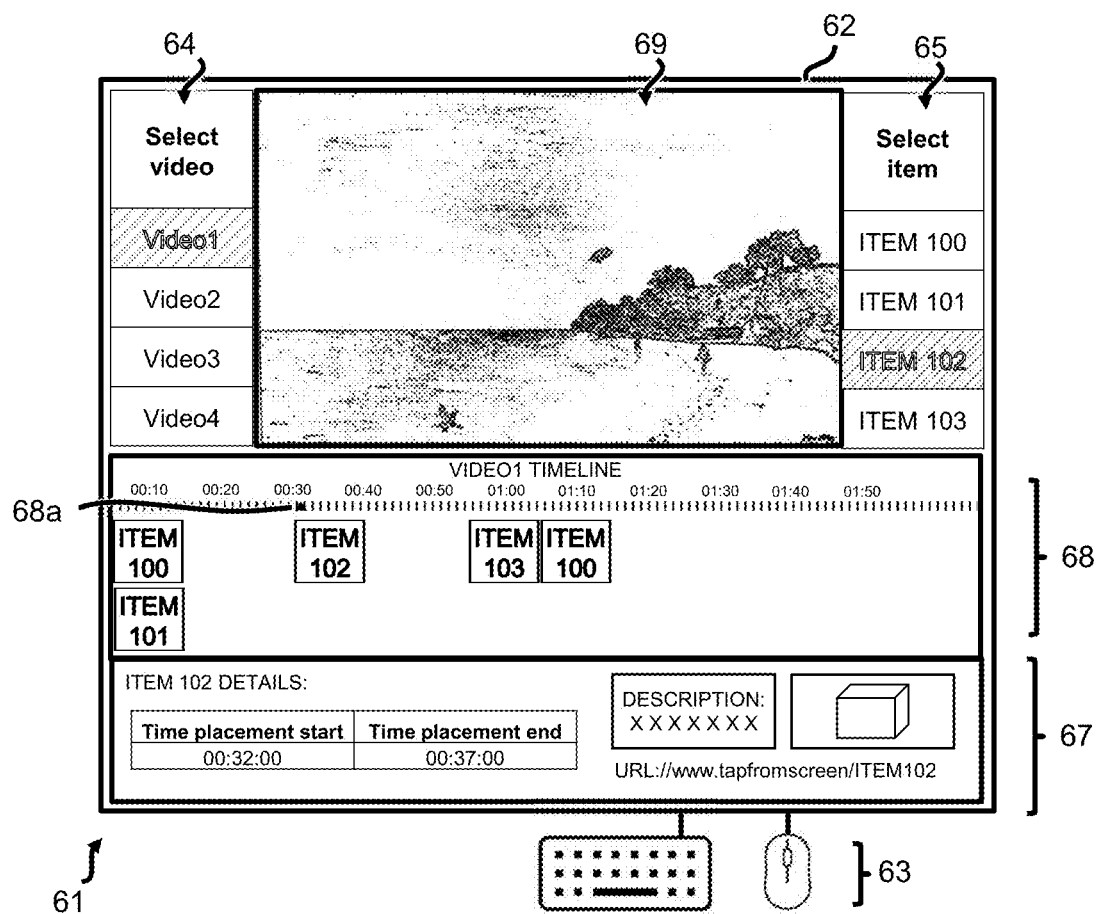
FIG. 4 is a schematic drawing of a device implementing an item registration interface of the system of FIG. 1.

FIG. 4 is a schematic drawing of the item-managing user device 61, the device 61 having a screen 62 via which a graphical representation of the item registration interface 61 is displayed. The item-managing user device 61 also includes input components 63, such as a keyboard and mouse, allowing the item-managing user to make the necessary selections to register items.

The item registration interface 61 comprises a video selection interface 64 and an item selection interface 65 which are configured to receive inputs from the item-managing user to respectively specify a video, and at least one item. A video identified as Video 1, and an item identified as ITEM 102 are highlighted in FIG. 4 to demonstrate that they are selected.

The video selection interface 64 include access to a video library via which the item-managing user can search for, filter and select a video. A preview of the video may also be provided. The video selection interface 64 may connect to the source video repository 22, and use that repository as a library.

The item selection interface 65 includes access to ecommerce facilities via which item details, including description, images, price and so on can be obtained. The item selection interface may also allow items to be specified by the item-managing user via manual entry of those item details. Alternatively, the item-managing user can provide the item selection interface 65 with an item URL and, in response, the item selection interface 65 is configured to navigate to the item URL, and process the data stored there to obtain relevant information about an item. For example, the URLs can be to websites featuring items to be registered.

The item registration interface 61 further comprises an item details panel 67 via which details about a selected item can be displayed and edited. Such details include a description, an image and a price for example.

The item registration interface 61 further comprises a timeline tool 68 configured to present a timeline representation of the selected video (Video1) to the item managing user. The timeline tool 68 is configured to receive inputs from the item-managing user to specify a time location within the video, for example by positioning a timeline slider element 68a.

Moreover, the item registration interface is configured to receive an input from that user to associate at least one specified item with that time location. For example, items boxes can be dragged and dropped into the timeline, with the position of the item box along the timeline specifying the time location. The time location is typically a period having a start time and end time, corresponding to the values of the time placement attributes in the records 51 of the database 5. The precise time location can be specified by the item-managing user in various way, including inputting the values into time placement fields of the item details panel 67.

Other item information and functionality can also be provided by the item registration interface. For example, for purchasable product items, information and functionality associated with delivery and logistics may be added, such as entities responsible for stocking and delivering the items. Furthermore, in certain embodiments, the item registration interface may comprise application program interfaces to link the server 4 to warehousing, stock and package delivery systems to exchange information with them that is relevant to a retail transaction.

The item registration interface 61 may further comprise a video preview panel 69 via which the selected video (Video1) can be played by the item-managing user. Moreover, the video preview panel is configured to display a portion of the video corresponding to the time location specified by the item managing user.

The item registration interface 61 converts the selections and specifications of the item-managing user into data to populate the records 51 of the database 5. Specifically, values for the attributes associated with items 57, 58, 59, 57*n*, 58*n*, 59*n*, and video ID can be generated by the interface. Thus, an item-managing user, via the interface 61 can predefine which items should be registered to a particular record.

The database population module 42 further populates values of attributes associated with video clip signatures 53, next signature in sequence 54, and video clip time location 56. This is typically done before the item registration interface 61 is used.

The database population module 42 comprises a signature generator 43 that is configured to receive an image as an input and in response output a signature of that image. A corresponding signature generator is provided on the user device 3 such that, given the same input image, both the server 4 and the mobile user device 3 will generate the same signature. Nonetheless, to differentiate the provenance of a signature, it is described herein that the signature generator provided on the user device outputs image signatures, and the signature generator 43 of the server 4 outputs video clip signatures.

In the present embodiment, the signatures that are generated comprise a multidimensional vector. This advantageously allows a vector similarity search to be used when searching the database 5 using the image signatures included with video search queries sent from the user device 3 as search parameters.

The signature generator 43 of the server 4 comprises at least a part of a computer-implemented convolutional neural network (CNN) 430, the CNN 430 itself outputting the multidimensional vector.

Initially, the CNN 430 is trained as an image classifier. The CNN comprises a succession of interconnected layers, vector outputs from earlier layers being used as inputs to later layers. The end layer of the CNN is typically the image classification layer.

The video signature generator 43 transmits an image to an initial input layer of the CNN, and then vector outputs from one of the end layers is used to provide a multidimensional vector as the output of the video signature generator 43.

Thus, whilst the CNN is trained as an image classifier, the classification layer is not used to classify the input image. Rather the classification layer, or one of the layers prior to the classification layer outputs a multidimensional vector as a reliable signature of the input image.

The use of a CNN to output a signature in this way has been determined to be advantageous because the signature generated is a reliable indicator of the content of the image, generally unaffected by image distortions such transform or colour shifts.

Accordingly, the signature generated using a source video frame as an input, and the signature generated using a captured image of that same video frame will be very similar to one another despite significant disparities between the inputs cause by image capture.

Once the CNN 430 is trained to function, at least in part, as a video signature generator, it is made available to the user device 3. For example, the trained CNN can be provided as part of the app 11 that is downloaded to the user device 3. Alternatively, the CNN can be transferred from the server 4 to the user device 3 to update the app 11 with an appropriate signature generator. Accordingly, a CNN can be used in forming video search queries that include image signatures derived from images.

The population operation executed by the database population module 42 comprises loading a source video, for example from the source video repository 22, or the live broadcast feed 23, and then sending frames of that loaded source video to the signature generator 43 to generate a video clip signature corresponding to a respective frame.

The video clip signature can then be stored in a record of the database 5 in association with values of a video identifier (e.g. Video1) of the loaded source video, as well as values of a video clip time location. A timing reference 44 of the database population module 42 is queried to obtain a time value for the video clip time location. The video identifier uniquely references the video to allow it to be located in a database.

The population operation executed by the database population module 42 further comprises sequentially linking records 51 of the database 5 together in correspondence with whether the video clip signatures of those records are derived from sequential video clips. For example, two video clip signatures may be stored in a record of the database, a primary signature associated with the current video clip, and a secondary signature associated with the next video clip.

As mentioned, the source video may be loaded from the source video repository 22 which contains pre-recorded video content. Alternatively, the source video may have a different provenance, originating from a live broadcast, for example. In either case, the video content comprises a succession of image frames, which can be processed by the signature generator to generate corresponding video clip signatures.

The timing reference 44 is configured to determine a time value for use as the video clip time location in dependence on the provenance of the source video. In particular, if the source video derives from a live broadcast, the time value corresponds to the live time of transmission. If the source video derives from a pre-recorded source video, then the time value that is provided may be relative to an end of the pre-recorded video: e.g. elapsed time since the start of video.

The database population module may also execute a frame selection routine in which a subset of frames of the loaded source video are selected, prior to passing them to the signature generator. Whilst this leads to a signature representation of the video content that has a lower temporal resolution, it has been determined that this does not significantly affect searching performance, especially when compared to the advantage of the reduced computational burden of processing and storing every frame of the source video. It is postulated that this beneficial trade-off can be made due to the general temporal stability of images in most video content.

In one embodiment, the frame selection routine may sample frames at predetermined intervals—for example, one every second (i.e. every thirty frames for video played at 30 frames per second). In another embodiment, the frame selection routine may progressively compare successive frames to determine a delta (i.e. image difference) between them, and then select frames to pass to the signature generator when the delta exceeds a set threshold.

Thus, by performing the population operation, the database can be populated with records that are indexable via their video clip signatures, and each record having associated with its signature a video identifier and a video clip time location.

The population operation comprises adding predefined items to records of the database. To this end, the population operation may comprise performing an item registration operation as described above, using the item registration interface 6.

It should be noted that whilst videos are described to be loaded to the server 4 from the source video repository 22 or the live broadcast feed 23, such loading is temporary, and for the purpose of processing the images contained by those videos to derive video clip signatures. The source video is not stored on the server 4. Advantageously, this reduces the storage burden of the database 5, and can avoid infringement of legal rights associated with those videos.

As mentioned previously, items may take the form of digital content. This can include NFTs that represent ownership of digital content such as images and videos of live events. The system 1 accommodates for a particular use-case in which a user can purchase an NFT of an event broadcast via the live broadcast feed 23—for example a goal scored during a sports match.

The live broadcast feed 23 broadcasts a video that is received by both the video content player 2 and the server 4. The video content player 2 displays the content 21 of that broadcast via the screen 20. This is captured by the mobile user device 3 and processed to send as a video search query to the server 4.

Independently and substantially simultaneously to the operation of the video content player 2 and user device 3, the real-time NFT minting engine 46 receives the video content from the live broadcast feed 23, and mints an NFT (e.g. via interfacing with the NFT platform 94) that relates to an event occurring during the live broadcast such as the scoring of a goal. The server 4 automatically registers the NFT in the database as an item, and also populates the record in which that item is stored with a video clip signature generated from the video content from the live broadcast feed 23. The video identifier (e.g. relating to a channel broadcasting the live feed) and time via the time reference 44 is also stored.

Accordingly, upon receiving the query from the user device 3, that item in the form of an NFT that represents ownership of the video of the event, can be sent as a response to the video search query, and offered to the user via the user interface 37 of the mobile device 3. Moreover, for this use case, the user interface 37 connects a user expressing an interest in this NFT item to the NFT platform 94 and the auction platform 91 so that the user can compete in an auction with other users to purchase the NFT item.

Naturally, other use cases involving the sale or auction of other items can be similarly provided by the system 1 of the present embodiment. Thus, items such as products and services can be displayed to a user without the drawbacks associated with traditional product placement.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of at least one of the appended claims.

What is claimed is:

1. A method suitable for product placement in which items, such as products, are displayed in synchronisation with a video, the method comprising:
    predefining, in a database of records, an association between a set of items, and a corresponding set of video time locations of a video;
    at an arbitrary time during display of the video on a screen of a video content player:
    capturing images of the screen with a user device;
    generating a video search query derived from the captured images of the video;
    querying the database with the video search query to:
        identify the video being displayed on the screen of the video content player; and
        locate the set of items that are associated with the video time location corresponding to the arbitrary time at which the images were captured by the user device; and
    displaying the set of items located by the video search query in synchronisation with the video being displayed of the screen of the video content player;
    receiving a video search query that comprises a sequence of image signatures derived from a sequential set of images captured by the user device of the screen of the video content player; and
    performing a similarity search to identify a candidate sequential set of records of the database; wherein the candidate sequential set of records include a sequence of video clip signatures that have a similarity with the sequence of image signatures included with the video search query, the similarity being prespecified by a similarity threshold.

2. The method of claim 1, wherein the set of items are displayed on a user interface of the user device, separate from the screen of the video content player.

3. The method of claim 1, wherein the user interface is configured to display a changing set of items over time.

4. The method of claim 1, wherein the items that are displayed by the user interface are user-interactable.

5. The method of claim 4, wherein selection by a user of a user-interactable item initiates a transaction in which the user can purchase an article to which the item relates.

6. The method of claim 1, wherein the user device is configured to process each image of the video that is displayed on the screen of the video content player to derive an image signature from it, the video search query including the image signature.

7. The method of claim 1, wherein the user device is configured to transmit the video search query to a video search engine, and receive a response from the video search engine, the response comprising the set of predefined items to be displayed in synchronisation with the video displayed on the screen of the video content player.

8. The method of claim 7, wherein the video search engine is configured to transmit, in the response to the query, at least one item listing timestamp to enable at least one corresponding item to be listed by the user interface of the user device in synchronisation with the video displayed on the screen of the video content player.

9. The method of claim 8, wherein the user device is configured to calculate when to present the set of predefined items based on their respective item listing timestamp.

10. The method of claim 1, wherein the database comprises a database of records, each record storing and being indexed by a video clip signature, each record also storing in association with its respective video clip signature at least one of the set of predefined items.

11. The method of claim 10, wherein querying the database comprises performing a similarity search to identify a candidate record of the database.

12. The method of claim 11, further comprising setting a similarity threshold, and wherein identifying the candidate record comprises determining that the video clip signature of the candidate records has a similarity with an image signature included with the video search query that is above the similarity threshold.

13. The method of claim 10, wherein each database record stores, in association with its respective video clip signature, identifiers of the video and time location from which the video clip signature is derived.

14. The method of claim 10, wherein each database record is sequentially linked to one another in correspondence with whether the video clip signatures of those records are derived from sequential video clips.

15. The method of claim 1, further comprising sending, as a response to the video search query, any predefined item stored in the identified candidate sequential set of records.

16. The method of claim 1, further comprising sending, as a response to the video search query, predefined items stored in records subsequent to the identified candidate sequential set of records.

17. The method of claim 1, further comprising performing a population operation to populate the database of records, the population operation comprising at least one of:
  loading a source video;
  sending frames of that loaded source video to a signature generator to generate a video clip signature corresponding to a respective frame;
  storing the video clip signature in a record of the database in association with a video identifier of the loaded source video, as well as a video clip time location; and
  querying a timing reference to obtain a time value for the video clip time location.

18. The method of claim 17, wherein the population operation further comprises sequentially linking records together in correspondence with whether the video clip signatures of those records are derived from sequential video clips.

19. The method of claim 17, wherein the source video is loaded from at least one of: a source video repository of pre-recorded video content, and a live broadcast.

20. The method of claim 17, further comprising a frame selection routine in which a subset of frames of the loaded source video are selected, prior to passing them to the signature generator.

21. The method of claim 20, wherein the frame selection routine progressively compares successive frames to determine a delta between them, and then select frames to pass to the signature generator when the delta exceeds a set threshold.

22. The method of claim 17, wherein the frame selection routine sample frames at predetermined intervals.

23. The method of claim 17, wherein the population operation further comprises adding predefined items to records of the database via performing an item registration operation.

* * * * *